US012024329B2

(12) United States Patent
Baumann et al.

(10) Patent No.: US 12,024,329 B2
(45) Date of Patent: Jul. 2, 2024

(54) DEVICE FOR PREPARING PLASTIC CONTAINERS FOR BEING PUT INTO USE

(71) Applicant: KOCHER-PLASTIK MASCHINENBAU GMBH, Sulzbach-Laufen (DE)

(72) Inventors: Josua Baumann, Attelwil (CH); Martin Burgherr, Aarau (CH)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 492 days.

(21) Appl. No.: 17/291,356

(22) PCT Filed: Oct. 28, 2019

(86) PCT No.: PCT/EP2019/079419
§ 371 (c)(1),
(2) Date: May 5, 2021

(87) PCT Pub. No.: WO2020/104142
PCT Pub. Date: May 28, 2020

(65) Prior Publication Data
US 2022/0002018 A1 Jan. 6, 2022

(30) Foreign Application Priority Data
Nov. 23, 2018 (DE) ...................... 10 2018 009 238.1

(51) Int. Cl.
*B65B 61/02* (2006.01)
*B29C 69/00* (2006.01)
(Continued)

(52) U.S. Cl.
CPC ............ *B65B 61/06* (2013.01); *B29C 69/001* (2013.01); *B65B 59/04* (2013.01); *B65B 61/02* (2013.01); *B29L 2031/712* (2013.01)

(58) Field of Classification Search
CPC ......... B65B 61/06; B65B 59/04; B65B 9/042; B65B 61/02; B65B 65/02; B65B 61/065;
(Continued)

(56) References Cited

U.S. PATENT DOCUMENTS 3,583,294 A     6/1971  Lense
4,850,257 A *  7/1989  Mohr ..................... B26D 7/015
                                                          83/93

(Continued)

FOREIGN PATENT DOCUMENTS

CN      201192857      2/2009
CN      102381673      3/2012
(Continued)

OTHER PUBLICATIONS

CN104669332A PE2E Machine Translation (Year: 2023).*
(Continued)

*Primary Examiner* — Farah Taufiq
*Assistant Examiner* — Anna J. Perkins
(74) *Attorney, Agent, or Firm* — WENDEROTH, LIND & PONACK, L.L.P.

(57) ABSTRACT

A device for preparing plastic containers (16) for being put into use. The containers (16) are molded to one another in container blocks (17) side by side along separating lines (18). Along the separating lines, the individual containers (16) can be separated from one another for use. Cutter blades (28) are movably guided at least in part along the separating line. The cutter blades (28) are, arranged on a carriage (64) movably guided back and forth between a position of use and a position of non-use. In the position of use, the r cutter blades (28) are raised by a swivel device (54, 78, 82) and move along the separating lines (18). In the position of
(Continued)

non-use of the cutter blades, the cutter blades are lowered at a distance from the containers (16) to be separated from one another.

11 Claims, 5 Drawing Sheets

(51) Int. Cl.
*B65B 59/04* (2006.01)
*B65B 61/06* (2006.01)
*B29L 31/00* (2006.01)

(58) Field of Classification Search
CPC ......... B65B 61/28; B65B 61/00; B65B 61/08; B65B 2220/06; B65B 47/06; B65B 61/04; B65B 2210/04; B65B 61/16; B65B 2210/02; B65B 2220/22; B65B 65/04; B65B 59/001; B65B 59/02; B65B 9/026; B65B 57/00; B65B 59/00; B65B 9/02; B65B 9/06; B29C 69/001; B29C 2793/0036; B29C 2793/009; B29L 2031/712

See application file for complete search history.

(56) References Cited

U.S. PATENT DOCUMENTS

| | | | | |
|---|---|---|---|---|
| 5,682,729 | A * | 11/1997 | Buchko | B26D 1/045 |
| | | | | 53/251 |
| 2010/0224048 | A1* | 9/2010 | Hansen | B29C 59/007 |
| | | | | 83/883 |
| 2011/0072764 | A1* | 3/2011 | Daniek | B26D 7/2614 |
| | | | | 53/556 |
| 2011/0271812 | A1 | 11/2011 | Maier et al. | |
| 2015/0119216 | A1* | 4/2015 | Benterman | B26D 5/007 |
| | | | | 493/309 |
| 2015/0148210 | A1* | 5/2015 | Sibthorpe | B41J 3/407 |
| | | | | 493/324 |
| 2021/0197443 | A1* | 7/2021 | Such | B29C 63/0004 |

FOREIGN PATENT DOCUMENTS

| | | | | |
|---|---|---|---|---|
| CN | 102501266 | | 6/2012 | |
| CN | 104669332 A | * | 6/2015 | |
| DE | 79 04 734 | | 7/1980 | |
| DE | 197 24 040 | | 8/1998 | |
| DE | 10 2007 060 419 | | 12/2008 | |
| DE | 10 2017 112 563 | | 12/2018 | |
| EP | 1 026 083 | | 8/2000 | |
| EP | 2 384 866 | | 11/2011 | |
| EP | 3412416 A1 | * | 12/2018 | |
| FR | 2 644 425 | | 9/1990 | |
| WO | 2004/033306 | | 4/2004 | |
| WO | WO-2016142710 A1 | * | 9/2016 | ............. B65B 57/00 |

OTHER PUBLICATIONS

EP3412416A1 ESpacenet Machine Translation (Year: 2023).*
DE19724040A1 ESpacenet Machine Translation (Year: 2023).*
International Search Report (ISR) issued Feb. 26, 2020 in International (PCT) Application No. PCT/EP2019/079419.

* cited by examiner

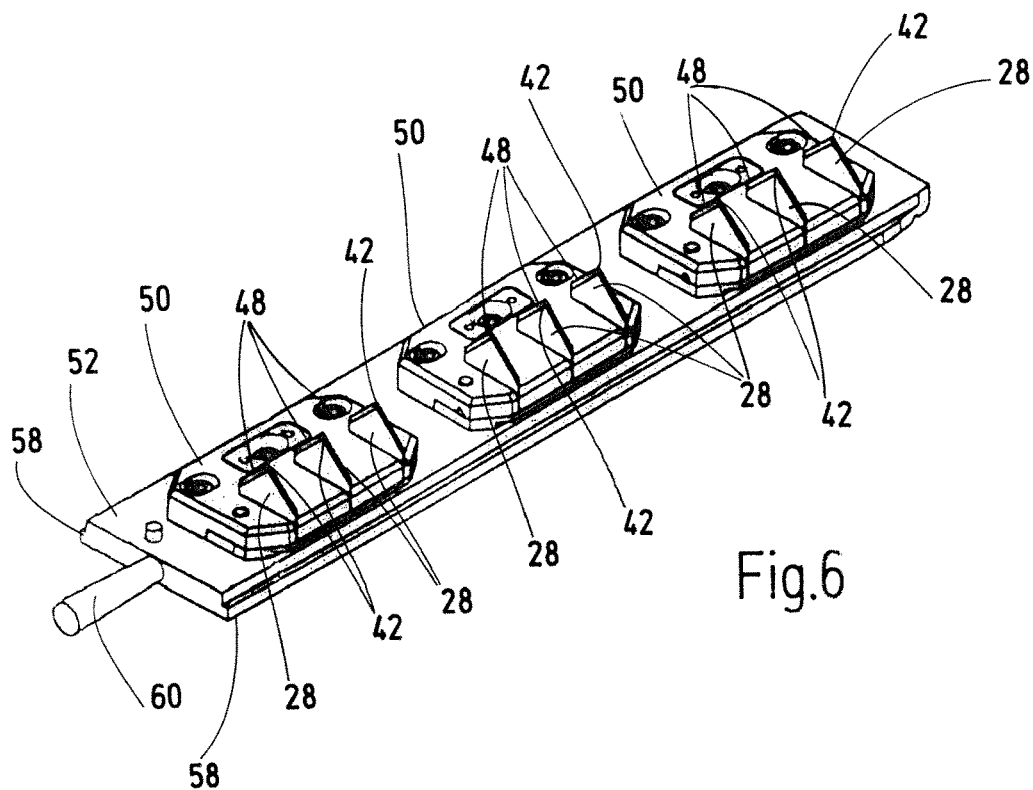
Fig.6
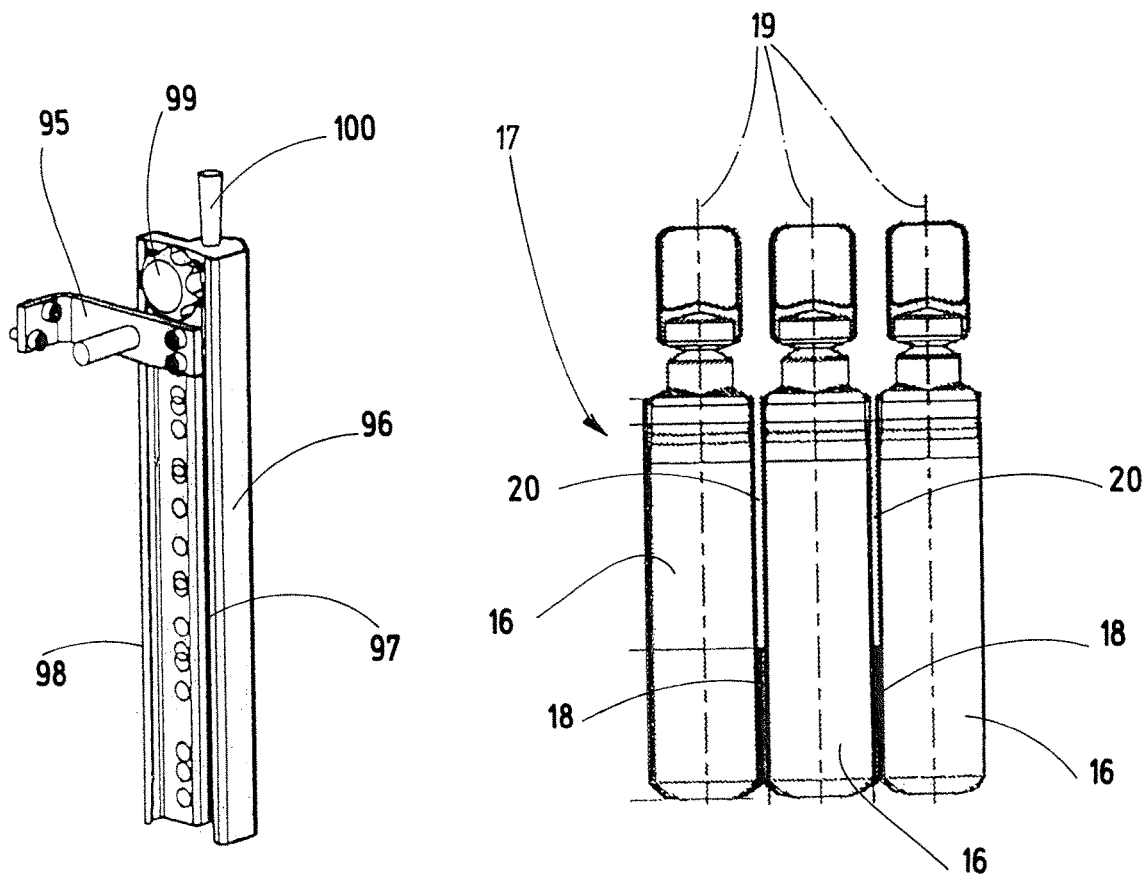
Fig.7
Fig.8

DEVICE FOR PREPARING PLASTIC CONTAINERS FOR BEING PUT INTO USE

FIELD OF THE INVENTION

The invention relates to a device for preparing plastic containers for being put into use, wherein the containers are molded to one another in container blocks side by side along separating lines, along which the individual containers can be separated from one another for use, and along which at least in part cutter blades are movably guided.

BACKGROUND OF THE INVENTION

In the prior art, plastic containers are advantageously manufactured using the well-known Bottelpack® process, in which a tube of plasticized plastic material, such as polyethylene or polypropylene, is extruded into a molding device, and the resulting container is filled in the molding device in a sterile manner and hermetically sealed. The plastic material produced at high production rates exits these manufacturing devices as a container chain, in which a plurality of individual containers is linked side by side next to each other. Further processing is performed such that, as a continuation of the production line, a punching device is used to punch container blocks or ampoule blocks out of the container chain, in particular having the form of an ampoule belt, wherein each block has a number of individual containers suitable for dispatch and use, wherein frequently ampoule blocks having three or five ampoules each, interconnected at separating lines, are provided.

While the arrangement of the ampoules in blocks is convenient and advantageous in terms of packaging and dispatch, the putting into use of the individual containers or ampoules is not very user-friendly, especially when the plastic material is relatively rigid, as with polypropylene containers. To facilitate separating the ampoule blocks for the user, a device of the type mentioned above is disclosed in DE 10 2007 060 419 B3, wherein the device renders forming a pre-separation cut along the respective separation lines by cutter blades feasible, wherein the length of the pre-separation cut relative to the total length of the separation lines is selected such that, for packaging and dispatch, the remaining length of the separation line provides secure cohesion, and separation can be performed easily and without much effort.

In the known device, radially projecting oscillating blades are arranged on a motor-driven blade shaft for pre-separation cuts to be made at the separation line of the ampoule blocks. Because of the high frequency aimed at in efficiently working container manufacturing systems, several containers enter the pre-separation station per transport step, which is therefore designed to have a corresponding number of oscillating blades that have to be driven for the cutting process. For the relatively stiff plastic material, such as polypropylene, a relatively large drive force for the blade shaft is required. In the known solution, the oscillating blades on the blade shaft are therefore offset by such angles of rotation that the pre-separation cuts are staggered in time with respect to each other and the containers remain in the pre-separation station for the duration of several cuts, resulting in a limitation of the achievable frequency.

SUMMARY OF THE INVENTION

Based on this prior art, the invention addresses the problem of providing a device of the genus mentioned at the beginning, which is characterized by a further improved operating performance while maintaining the advantages achieved in the prior art.

According to the invention, this problem is basically solved by a device having, as an essential feature of the invention, the respective cutter blade, arranged on a carriage and movably guided back and forth between a position of use and a position of non-use. In the position of use the respective cutter blade raised by a swivel device, moves along the respectively assignable separating line and in its non-use position is lowered at a distance from the containers to be separated from one another. Instead of a guillotine-type blade stroke, the cutter blades in the raised operating position perform the cutting process as a pulled cut during a traversing motion of the carriage holding the blades. In this way, a simply formed drive can be used to perform simultaneously the pre-separation cuts on several ampoule blocks, each of which has several ampoules, by a matching number of cutter blades faster, more reliably and particularly efficiently.

In advantageous exemplary embodiments, the cutter blades are arranged in groups on a blade bar that is preferably detachably connected to the swivel device. Based on this arrangement, service and maintenance work is quick and easy because the cutting unit having the blade bar can be removed and replaced as a whole for replacing cutter blades. Because of the arrangement of the cutter blades in groups on the blade bar, the cutter blades assigned to a respective ampoule block can also be replaced together as a group.

The swivel device can advantageously have at least one actuator, which, in an actuated position, swivels the blade bar about a swivel axis towards the container blocks. In an advantageous manner, the respective actuator can have a linear drive that is hydraulically or electrically actuated.

In advantageous exemplary embodiments, the swivel device is mounted on the carriage, which is guided longitudinally displaceable along guides of a stand device by at least one further actuator. This actuator can also advantageously be formed by an electrically or hydraulically actuated linear drive. The carriage guiding permits high displacement forces generated by the linear drive to be transmitted to the blade bar in a simple and safe manner, such that the cutting force for optimum pre-separation cuts can be applied even for a larger number of cutter blades.

Advantageously, the arrangement is such that the container blocks, forming a continuous block chain and extending in one plane and in the position of use of the cutter blades extending with their separating lines along the same, are guided in the stand device. As a result, the container blocks enter the pre-separation station of the stand device in a guide track aligned with the plane of the blade bar.

In advantageous exemplary embodiments, in the stand device a down-holding device is guided longitudinally movable up and down and transversely to the traversing motion of the block chain, wherein when lowered in its holding position the down-holding device exerts a force on the block chain, which counteracts the contact force or engagement force of the cutter blades. By securing the position of the container blocks during the cutting process, the pre-separation cut can be made precisely applying the desired cutting length and position.

Advantageously, the arrangement can be such that on the down-holding device centering means or a centerer are arranged, which position the block chain transverse to the direction of the traversing motion when in the lowered holding position. In this way, the cutter blades are precisely aligned with the separating lines in the cutting process.

In advantageous exemplary embodiments, the swivel device, connected to each other in the manner of a kinematic chain, has an arm drive, one free end of which is articulated to the respective assignable actuator and the other free end of which is articulated to a swivel table, which supports the blade bar, preferably conceived as an insertion part. Advantageously, a kind of drawer can be provided on the swivel table as a receptacle for a blade bar formed as an insertion part, wherein into the drawer the blade bar in the form of a rectangular strip, can be slid-in and pulled out for exchanging the blades. In this way, injuries to an operator, who has to exchange blades, are avoided.

Advantageously, the arrangement can be made such that the blade bar, covered by a hood-shaped protection device, can be removed from the swivel table and can again be used there with replaced or exchanged blades. The blade drawer is formed such that the blade bar can be slid-in together with its protective hood and that the protective hood can be re-extracted while the blade bar remains in the drawer.

In advantageous exemplary embodiments, on the blade bar the individual cutter blades, arranged in individual islands, have as many cutter blades as separating lines are required for at least preliminary separating the containers of a container block from each other and/or from another, adjacent container block.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 3a is an enlarged partial side view of the area designated by A in FIG. 3;

FIG. 6 is a perspective view of the separately depicted blade bar of the exemplary embodiment of the device;

FIG. 7 is a perspective view of a separately depicted protective hood of the cutting blade with associated hood holder of the device of the exemplary embodiment; and FIG. 8 is a front view of a part of an ampoule block provided with pre-separation cuts.

DETAILED DESCRIPTION OF THE INVENTION

Figure 1:
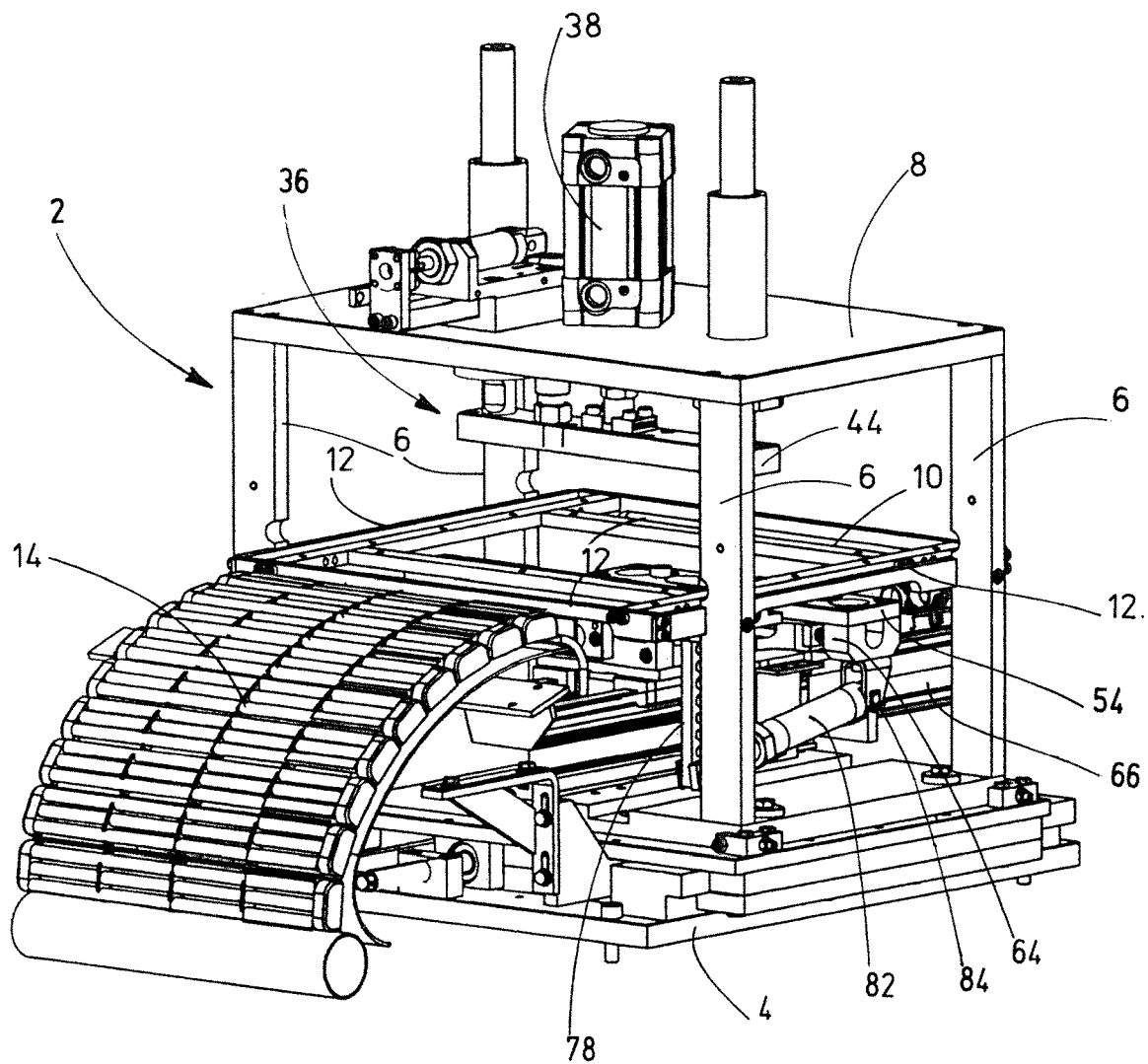
FIG. 1 is a perspective view of a device according to an exemplary embodiment of the invention having a feed device, drawn in a schematically simplified manner, for feeding container block chains to the stand device of the device.

The exemplary embodiment of the device according to the invention shown in the figures has a stand device or stand 2 having a base plate 4 having a square outline. From the four corner areas of the base plate 4, support pillars 6, formed by rectangular flat bars that provide the support for a flat cover plate 8, extend upward in the vertical direction. At approximately halfway, the supporting pillars 6 are connected to cross-bars 12 by an intermediate frame 10. Below the cross-bars 12 at the front in FIG. 1, an arcuate conveyor track 14 forms the infeed device, which is used to feed container chains (not shown) to the pre-separation station, which is located in the stand device 2 below the intermediate frame 10. In this example, three block chains arrive at the pre-separation station via the conveyor track 14, each chain being formed of successive ampoule blocks 17, each block having four ampoules 16, three of which are shown in FIG. 8, and which ampoules are interconnected at separation lines 18.

In the block chains (not shown), the ampoules 16 are arranged such that their longitudinal axes 19 extend in the direction of feeding. The pre-separation station has a guide track 22 adjoining the conveyor track 14 feeding three block chains, wherein through the guide track 22 the block chains having the successive ampoule blocks 17, each formed of four ampoules 16, are moved in the feeding direction, shown by the arrow 24 in FIG. 5, in time with the container production device. The guide track 22 in the form of a channel, extending across the width of the block chains, is delimited by a lower guide plate 30 at the bottom and by an upper guide plate 31 at the top. The lower guide plate 30 is supported by a table having support beams 26 spaced at a distance from each other. In the lower guide plate 30, there are slots 32 (see FIG. 5) extending in the feeding direction, wherein the slots 32 are aligned with the separating lines 18 of the ampoule blocks 17 passing through the guide track 22 and permit cutter blades 28 to pass through from below. The upper guide plate 31 has a central recess that extends across the entire width of the guide track 22 and permits a clamping and holding device 36 to access the block chains from above.

In the feed direction, the recess is delimited by raised end edges 34 of the upper guide plate 31. The holding device 36 has a pressure plate 44 which extends approximately across the length, viewed in the feed direction (arrow 24), of the recess of the guide plate 31 and the width of the recess, measured perpendicular to the drawing plane of FIGS. 3 to 5. The pressure plate 44 can be moved back and forth in the vertical direction by a linear drive 38 supported on the cover plate 8 (FIG. 1) of the stand device 2, as indicated by the double arrow 40 in FIG. 5.

Figure 3:
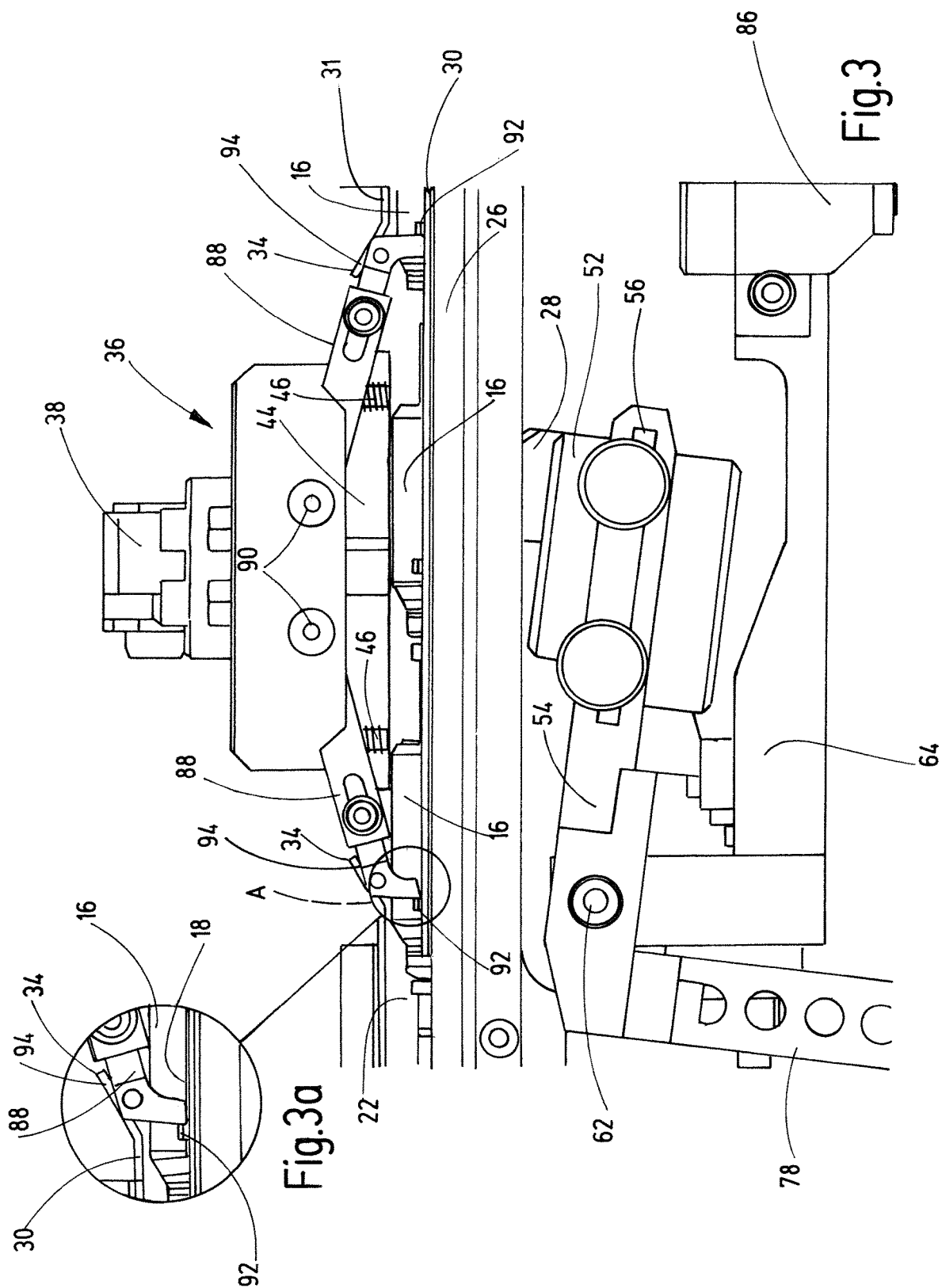
FIG. 3 is a partial side view of the pre-separation station located in the stand device of the device of the exemplary embodiment, wherein the operating state "clamping, centering" is illustrated.
Figure 4:
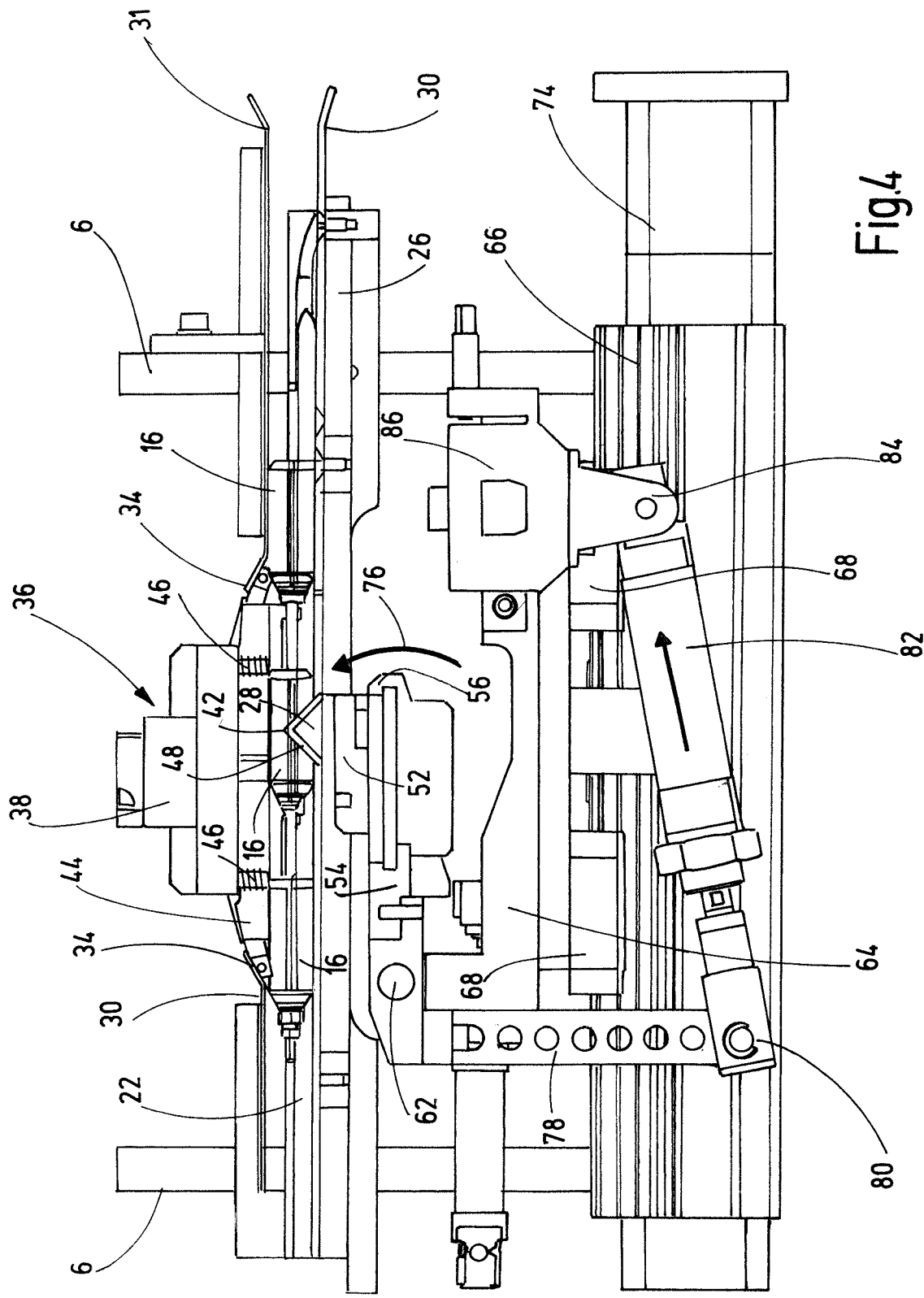
FIG. 4 is a side view of the stand device containing the pre-separation station of the device of the exemplary embodiment, wherein the operating state "piercing" is illustrated.
Figure 5:
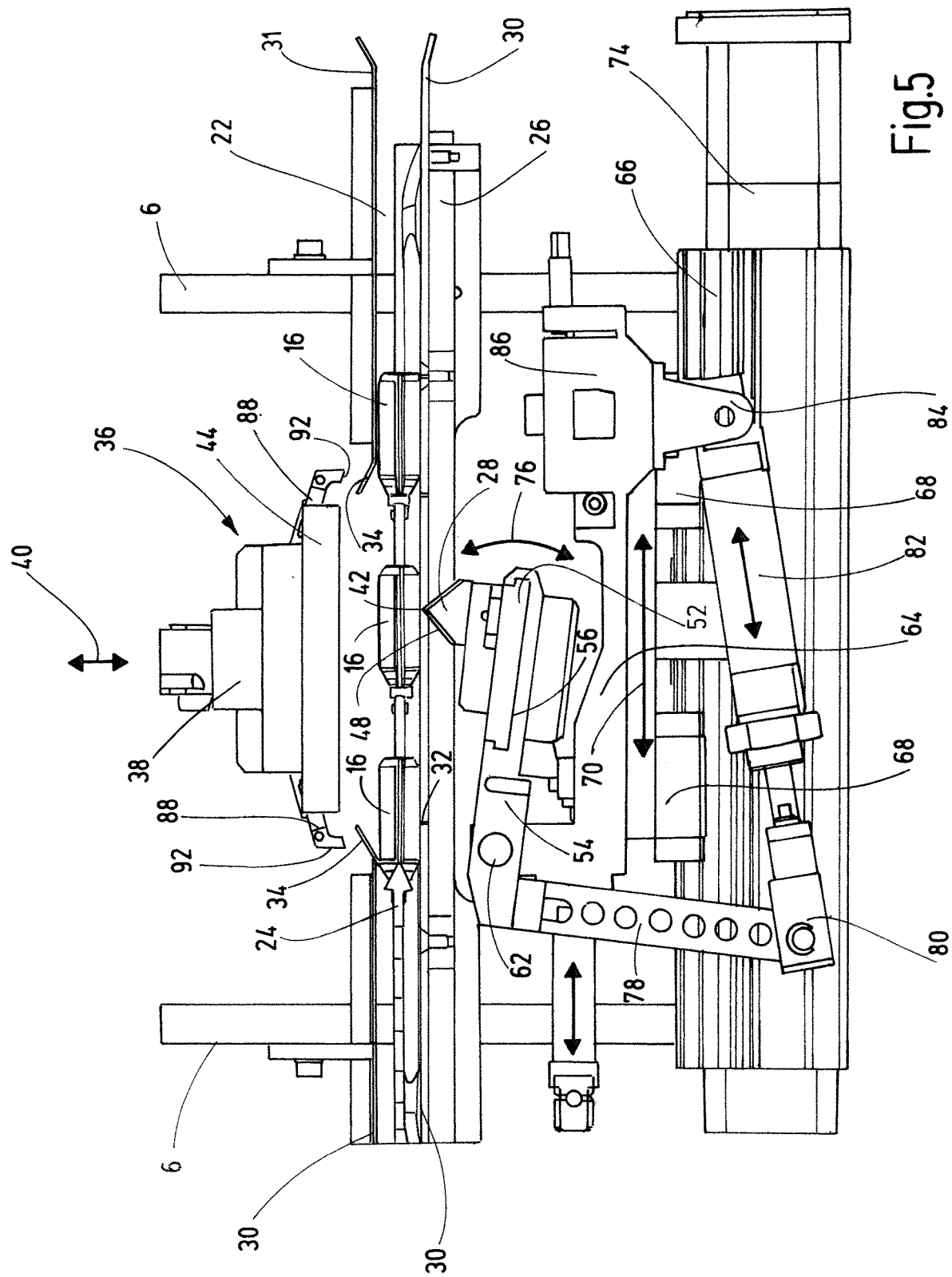
FIG. 5 is a side view of the stand device containing the pre-separation station of the device of the exemplary embodiment, showing the operating state "lifting, extending"

As shown in FIGS. 3 to 5, and most clearly in FIG. 3, the holding device 36 has pairs of laterally projecting centering arms 88, only one pair of which is depicted in the drawing. The arms 88 can be swiveled about swivel points 90 (FIG. 3) of the pressure plate 44 and are pre-stressed downwards by tension springs 46 for a swivel motion. The arms 88 have centering fingers 92 at their free ends. FIG. 3 shows the operating state "centering and holding", in which the holding device 36 is moved downward and the pressure plate 44 secures the ampoules 16 in the guide track 22, i.e., secures them against vertical and horizontal motion. Before the pressure plate 44 reaches the securing contact with the ampoules 16, the centering fingers 92 have engaged with the ampoules 16 in a centering manner by the pre-stress of the arms 88 exerted by the tension springs 46, such that the ampoule blocks 17 are accurately centered before being clamped by the pressure plate 44. As most clearly shown in FIG. 3a, slits 94 are formed in the raised end edges 34 of the upper guide plate 31 for the centering fingers 92 to pass through. After centering and holding, the process continues with the working step "penetrate" shown in FIG. 4.

As can be seen in FIGS. 2 and 4 to 6, the cutter blades 28 are each formed by a triangular shaped blade and are held the tip 42 at the top (see FIGS. 4 to 6), by blade carriers 50. A cutting edge 48 is formed at the respective cutting blade 28 on the leg of the triangular shape that is opposite to the feeding direction (arrow 24 in FIG. 5). The cutter blades 28 are grouped together on the blade carriers 50 in the form of flat blocks in groups of three, which are detachably mounted on a blade bar 52 by screwing. The blade bar 52, see FIG. 6, has the shape of a strip plate having a rectangular cross-section. The blade carriers 50 are arranged on the blade bar 52 in the manner of evenly distributed islands spaced apart from each other such that the blade planes of the cutter blades 28 extend in parallel to the feeding direction. The blade bar 52 is supported, see FIG. 2, on a swivel table 54, wherein the support is formed by a blade drawer 56, into which the blade bar 52 can be inserted and from which it can be re-extracted for blade replacement. For this purpose, in the blade drawer 56 an insertion guide is formed, which extends over lateral guide strips 58 projecting from the blade bar 52, see FIG. 6. As a handle for insertion and extraction, the blade bar 52 has a pin 60 projecting from one end face.

Figure 2:
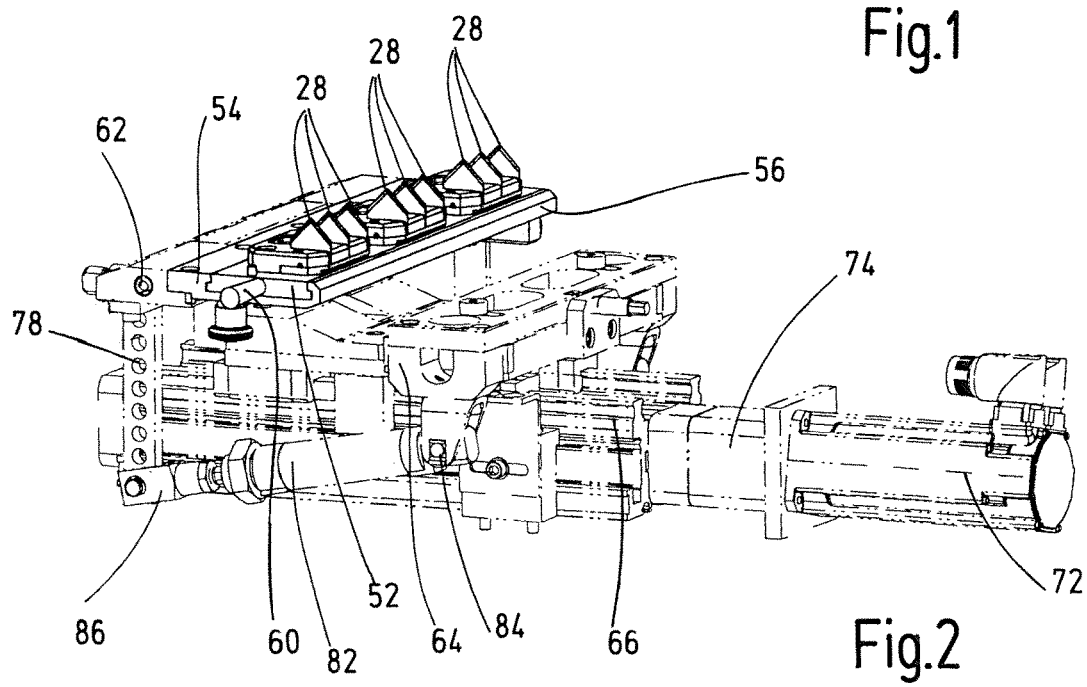
FIG. 2 is a perspective view, which shows the device part assigned to cutter blades and their drive, of the exemplary embodiment.

The swivel table 54 can be tilted about a swivel axis 62, which extends horizontal and perpendicular to the guide track 22 and is supported on a carriage 64 forming a traversing unit. The stand device 2 has a guide 66 extending in parallel to the guide track 22, wherein on the guide 66 the carriage 64 can be moved in both directions by carriage guides 68, as indicated by the double arrow 70 in FIG. 5. For these traversing motions, the carriage guides 68 are coupled to a linear drive 74 actuated by an electric motor (FIG. 2).

The swivel device for generating the swivel motions, indicated by the double arrow 76 in FIG. 5, of the swivel table 54 about the swivel axis 62 of the carriage 64 has an arm 78, which is firmly connected to the swivel table 54 at a distance from the swivel axis 62. The free end of the arm 78 is articulated to an articulation point 80 at the end of the piston rod of a hydraulic cylinder 82, the cylinder housing of which is in turn articulated at an articulation point 84 to a coupling member 86, which is an integral part of the carriage 64. In this arrangement, the traversing unit of the carriage 64 having the swivel table 54 and the cutter blades 28 can be moved both horizontally along the guide 66 and swiveled about the axis 62.

For penetrating, the piston rod of the hydraulic cylinder 82 is retracted such that the arm 78 and thus the swivel table 54 swivel counterclockwise. The blade bar 52 accordingly swivels upward in the direction of the arrow 76, and the tip 42 of the blades 28 penetrates the plastic of the ampoules 16 at the separating lines 18. In this swivel position shown in FIG. 4, the linear drive 74 is actuated in such a way that the carriage 64 moves to the left while the blade bar 52 is in the raised swivel position in FIG. 4, such that the cutting edges 48 of the pierced blades 28 form the pre-separation cuts 20 (FIG. 8) in a pulled cut. The components are then brought to the state "lifting out", shown in FIG. 5, of the holding device 36 and the subsequent feeding step of the precut ampoule blocks 17. For this purpose, the holding device 36 moves into the raised position of FIG. 5, and the hydraulic cylinder 82 extends the piston rod such that the swivel table 54 swivels clockwise and the tips 42 of the blades 28 are out of engagement with the guide track 22. The linear drive 74 moves the traversing unit of the carriage 64 back again to the right into the initial position for performing a subsequent penetration operation.

As an auxiliary device that renders the process of exchanging the blades more convenient and safer for the personnel, a blade protective hood 96 shown in FIG. 7 is provided, which is formed by a profile strip. On the side shown in FIG. 7, the profile is open, whereas on the opposite side it forms a closed hood whose shape is adapted to the triangular contour of the cutter blades 28. On the open profile side, the edges of the profile legs 97 and 98 are folded over such that they form a guide for the guide strips 58 protruding from the blade bar 52. The lower end (in FIG. 7) of the protective hood 96 can therefore be pushed onto the blade bar 52. The blade drawer 56 on the swivel table 54 is formed such that it forms an slide-in module for the unit comprising the blade bar 52 having the put on protective hood 96, so that the entire unit can be slid-in for blade installation and the hood 96 can then be pulled off. To remove the blade, the hood 96 can correspondingly be slid-in to remove the entire unit hood 96 and blade bar 52. A pin 100 is provided as a handle at the closed end face for handling the hood 96. To ensure that during normal process operation the blade plate 52 is used without a protective hood 96, to the stand device 2 a holder 95, shown in FIG. 7, is attached, to which the hood 96 can be attached by means of a clamping bolt 99 when not in use. In this case, this safety device can have a sensor that detects the presence of the hood 96 at the holder 95 and, in this case, permits the operation of the device. The device according to the invention can be used to pre-generate separating lines 18 not only for a subsequent, facilitated separation of the containers 16 from one another by hand at reduced wall thicknesses, but rather, with a matching cutting depth, separation of the containers 16 of a block 17 from one another can also be caused directly when required, for instance to sell the containers 16, completely separated from one another in this way, in a package individually (not shown) as a sales unit to users.

While one embodiment has been chosen to illustrate the invention, it will be understood by those skilled in the art that various changes and modifications can be made therein without departing from the scope of the invention as defined in the claims.

The invention claimed is:

1. A device for preparing plastic containers molded to one another in container blocks side by side along separating lines, along which separating lines individual containers can be separated from one another for use, the device comprising: a carriage horizontally movable between forward and back positions by a carriage actuator; and cutter blades pivotally mounted on the carriage and pivotally movable about a swivel axis between use positions and non-use positions by a cutter blade actuator connected to the carriage, in the use positions the cutter blades are raised to at least partially separate the individual containers from one another along the separating lines, in the non-use positions the cutter blades are lowered at a distance from the containers to be at least partially separated from one another, wherein the cutter blades are arranged in groups on a blade bar detachably connected to the cutter blade actuator, wherein an arm drive comprises one free end articulated to the cutter blade actuator and another free end articulated to a swivel table that supports the blade bar forming a kinematic chain.

2. The device according to claim 1 wherein the carriage is guided longitudinally displaceable along guides on a stand by the carriage actuator.

3. The device according to claim 2 wherein a guide in the stand is capable of conveying the container blocks in a continuous block chain in a movement direction extending in one plane with the cutter blades extending along the separating lines of the container blocks in the one plane in the use positions.

4. The device according to claim 3 wherein the stand comprises a down-holder guided for movement on the stand longitudinally movable up and down and transversely to the movement direction of the block chain, the down-holder being lowerable to a holding position thereof exerting a force on the block chain counteracting a contact force or engagement force of the cutter blades on the block chain.

5. The device according to claim 4 wherein the down-holder comprises a centerer positioning the block chain transverse to the movement direction of the block chain and to a direction of movement of the carriage when the down-holder is in the holding position.

6. The device according to claim 1 wherein the cutter blade actuator and arm drive form an insertion part.

7. The device according to claim 1 wherein the blade bar is covered by a protection hood removable from the swivel table and again useable with replaced or exchanged blades.

8. The device according to claim 1 wherein on the blade bar, the cutter blades are arranged in islands having as many cutter blades as the separating lines required to at least partially separate the containers of a container block from one another and/or from another adjacent container block.

9. The device according to claim 1 wherein the carriage actuator is a carriage linear actuator.

10. The device according to claim 9 wherein the cutter blade actuator is a cutter blade linear actuator with opposite ends pivotally connected to the carriage and a support having the cutter blades supported thereon.

11. The device according to claim 1 wherein the cutter blade actuator is a cutter blade linear actuator with opposite ends pivotally connected to the carriage and a support having the cutter blades supported thereon, respectively.

\* \* \* \* \*